US011283517B2

(12) United States Patent
Novlan et al.

(10) Patent No.: US 11,283,517 B2
(45) Date of Patent: *Mar. 22, 2022

(54) RESOURCE COORDINATION FOR INTEGRATED ACCESS AND BACKHAUL

(71) Applicant: AT&T Intellectual Property I, L.P., Atlanta, GA (US)

(72) Inventors: Thomas Novlan, Austin, TX (US); Arunabha Ghosh, Austin, TX (US); Ralf Bendlin, Cedar Park, TX (US); Xiaoyi Wang, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 15 days.

This patent is subject to a terminal disclaimer.

(21) Appl. No.: 16/877,549

(22) Filed: May 19, 2020

(65) Prior Publication Data

US 2020/0280368 A1 Sep. 3, 2020

Related U.S. Application Data

(63) Continuation of application No. 16/137,827, filed on Sep. 21, 2018, now Pat. No. 10,700,775.

(Continued)

(51) Int. Cl.
*H04B 7/26* (2006.01)
*H04B 7/155* (2006.01)
(Continued)

(52) U.S. Cl.
CPC ....... *H04B 7/2606* (2013.01); *H04B 7/15592* (2013.01); *H04W 72/0446* (2013.01);
(Continued)

(58) Field of Classification Search
CPC .............. H04B 7/2606; H04B 7/15592; H04B 7/0413; H04W 72/0486; H04W 72/0446; H04W 92/20
See application file for complete search history.

(56) References Cited

U.S. PATENT DOCUMENTS 8,457,079 B2   6/2013   Krishnamurthy et al.
9,118,466 B2   8/2015   Zhang et al.
(Continued)

FOREIGN PATENT DOCUMENTS

WO   2017188803 A2   11/2017
WO   2017194218 A1   11/2017

OTHER PUBLICATIONS

Non-Final Office Action received for U.S. Appl. No. 16/137,827 dated Oct. 30, 2019, 27 pages.
(Continued)

*Primary Examiner* — Dady Chery
(74) *Attorney, Agent, or Firm* — Amin, Turocy & Watson, LLP

(57) ABSTRACT

The described technology is generally directed towards dynamic resource coordination that supports multi-hop based relaying for integrated access and backhaul (IAB) in New Radio (5G). Described is a technology in which an IAB node and a serving parent node use wireless signaling to dynamically adapt downlink and uplink resources used for access and backhaul links. An IAB node receives scheduling data from a parent node, configures a frame structure comprising mobile termination function subframes and distributed unit component subframes, and communicates data based on the frame structure. The parent node explicitly or implicitly indicates that a portion of the scheduling data is adaptable, e.g., sends a dynamic frame structure coordination message. In response, the IAB node can adapt the frame structure into a modified frame structure and can communicate further data based on the modified frame structure.

20 Claims, 13 Drawing Sheets

Related U.S. Application Data

(60) Provisional application No. 62/670,388, filed on May 11, 2018.

(51) Int. Cl.
*H04W 72/04* (2009.01)
*H04W 92/20* (2009.01)
*H04B 7/0413* (2017.01)

(52) U.S. Cl.
CPC ....... *H04W 72/0486* (2013.01); *H04B 7/0413* (2013.01); *H04W 92/20* (2013.01)

(56) References Cited

U.S. PATENT DOCUMENTS

| | | |
|---|---|---|
| 9,119,097 B2 | 8/2015 | Chatterjee et al. |
| 9,231,723 B2 | 1/2016 | Zhu et al. |
| 9,591,651 B2 | 3/2017 | Dinan |
| 9,628,252 B2 | 4/2017 | Lahetkangas et al. |
| 9,749,099 B2 | 8/2017 | Seo et al. |
| 2012/0005913 A1 | 1/2012 | McKinley |
| 2016/0124078 A1 | 6/2016 | Salem et al. |
| 2016/0294521 A1 | 10/2016 | Au et al. |
| 2017/0208574 A1 | 7/2017 | Ramakrishna et al. |
| 2017/0353947 A1 | 12/2017 | Ang et al. |
| 2017/0367113 A1 | 12/2017 | Huang et al. |
| 2018/0041979 A1 | 2/2018 | Hampel et al. |
| 2018/0042031 A1 | 2/2018 | Hampel et al. |
| 2018/0063818 A1 | 3/2018 | Chen et al. |
| 2018/0092139 A1 | 3/2018 | Novlan et al. |
| 2018/0098225 A1 | 4/2018 | Damnjanovic et al. |
| 2018/0098349 A1 | 4/2018 | Sun et al. |
| 2018/0124718 A1 | 5/2018 | Ng et al. |
| 2019/0306846 A1* | 10/2019 | Luo .................. H04L 1/18 |

OTHER PUBLICATIONS

AT&T, et al., "Study on Integrated Access and Backhaul for NR," 8881123GPP TSG RAN Meeting #75 RP-170821, Dubrovnik, Croatia, Mar. 6-9, 2017, 5 pages.

Dahlman, et al., "5G radio access," Ericsson Review, Jun. 18, 2014, 6, 8 pages.

Grandi, et al., "SWAM: SON-based Wi-Fi Small Cells with Joint Access-Backhaul and Multi-Tenant Capabilities," arXiv:1804.07106v1 [cs.NI]Apr. 19, 2018, 10 pages.

Hu, et al., "Spectrum and Energy Efficient Heterogeneous Wireless Networks," Proc. of Tutorial (T5), WCNC 2013 (2013), 148 pages.

Liu, et al., "A Novel Multi-Service Small-Cell Cloud Radio Access Network for Mobile Backhaul and Computing Based on Radio-Over-Fiber Technologies," Journal of Lightwave Technology, vol. 31, No. 17, Sep. 1, 2013, 7 pages.

Peng, et al., "System Architecture and Key Technologies for 5G Heterogeneous Cloud Radio Access Networks," arXiv:1412.6677v1 [cs.IT] Dec. 20, 2014, 20 pages.

U.S. Appl. No. 16/137,827, filed Sep. 21, 2018.

\* cited by examiner

RESOURCE COORDINATION FOR INTEGRATED ACCESS AND BACKHAUL

RELATED APPLICATIONS

This application is a continuation of, and claims priority to, U.S. patent application Ser. No. 16/137,827 (now U.S. Pat. No. 10,700,775), filed Sep. 21, 2018, and entitled "RESOURCE COORDINATION FOR INTEGRATED ACCESS AND BACKHAUL", which applications further claim the benefit of priority of U.S. Provisional Patent Application No. 62/670,388, filed May 11, 2018 entitled "RESOURCE COORDINATION FOR INTEGRATED ACCESS AND BACKHAUL." The entireties of the aforementioned applications are hereby incorporated herein by reference.

TECHNICAL FIELD

The subject application is related to wireless communication systems, and, for example, to coordination of resources for integrated access and backhaul.

BACKGROUND

Due to the larger bandwidth available for New Radio (NR, e.g., in the mmWave spectrum) compared to LTE, along with the native deployment of massive MIMO (Multiple-Input Multiple-Output) or multi-beam systems in NR, integrated access and backhaul (IAB) links can be developed and deployed. This may, for example, allow easier deployment of a dense network of self-backhauled NR cells in a more integrated manner by building upon many of the control and data channels/procedures defined for providing access to (user equipment's (UEs). In general, an integrated access and backhaul link multiplexes access (mobile terminal/e.g., user equipment) and backhaul (distributed unit/e.g., access point) links in time, frequency, and/or space (e.g., beam-based operation) to relay user traffic to a donor or parent IAB node, and vice-versa.

The design of a multi-hop IAB in 3GPP is based on a hierarchical concept, which allows using the various downlink and uplink procedures and channels to create a multi-hop network. This can be done by having a user equipment (UE) function (IAB-UE) and a gNB or distributed unit (DU) function (IAB-DU) at each relay. The IAB-UE function is used for communicating with the parent node(s), whereas the IAB-DU function is used for communicating with the child nodes or a UE as shown in FIG. 2 (illustrating half-duplex constraint at the relay). The UE function within the relay node is also referred to as MT (mobile terminal).

An advantage of IAB is that backhaul and access are integrated and multiplexed in the scheduler, allowing dynamic resource allocation between the backhaul and access links (in both downlink and uplink directions). As a result, the duplex constraint at the relay that prevents simultaneous transmission and reception is a factor when considering how to multiplex access and backhaul links. This consideration can become more significant when supporting multiple hops of backhaul links, each with a similar duplex constraint. For example, the latency/overhead introduced by orthogonal partitioning of resources in either time or frequency can be considered. In particular, with mmWave frequencies which are typically TDD (Time Division Duplex), a practical scenario for initial IAB deployments is to enforce a half-duplex constraint at the relay, wherein the nodes transmit on the access link and/or backhaul link at any given time.

Time-division-multiplexing (TDM)/frequency division-multiplexing (FDM) may be used with access and backhaul links. TDM partitioning has downlink/uplink switching gaps between both the backhaul directions as well as for the access links, while a guard band is introduced between backhaul subframes in the case of FDM.

Furthermore, the native deployment of massive MIMO systems in NR also allows supports a complementary multiplexing technique of spatial reuse (e.g., spatial division multiplexing, or SDM) between the backhaul and access links. For example, while still assuming a half-duplex constraint at the eNB/relay, it is possible that uplink access traffic can be received while simultaneously receiving backhaul traffic. Likewise, the downlink access traffic can be served while also transmitting backhaul/relay traffic. Depending on the backhaul frame structure and support for beamforming, the access and backhaul traffic can be transmitted using orthogonal resources or by multi-user MIMO transmission schemes.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
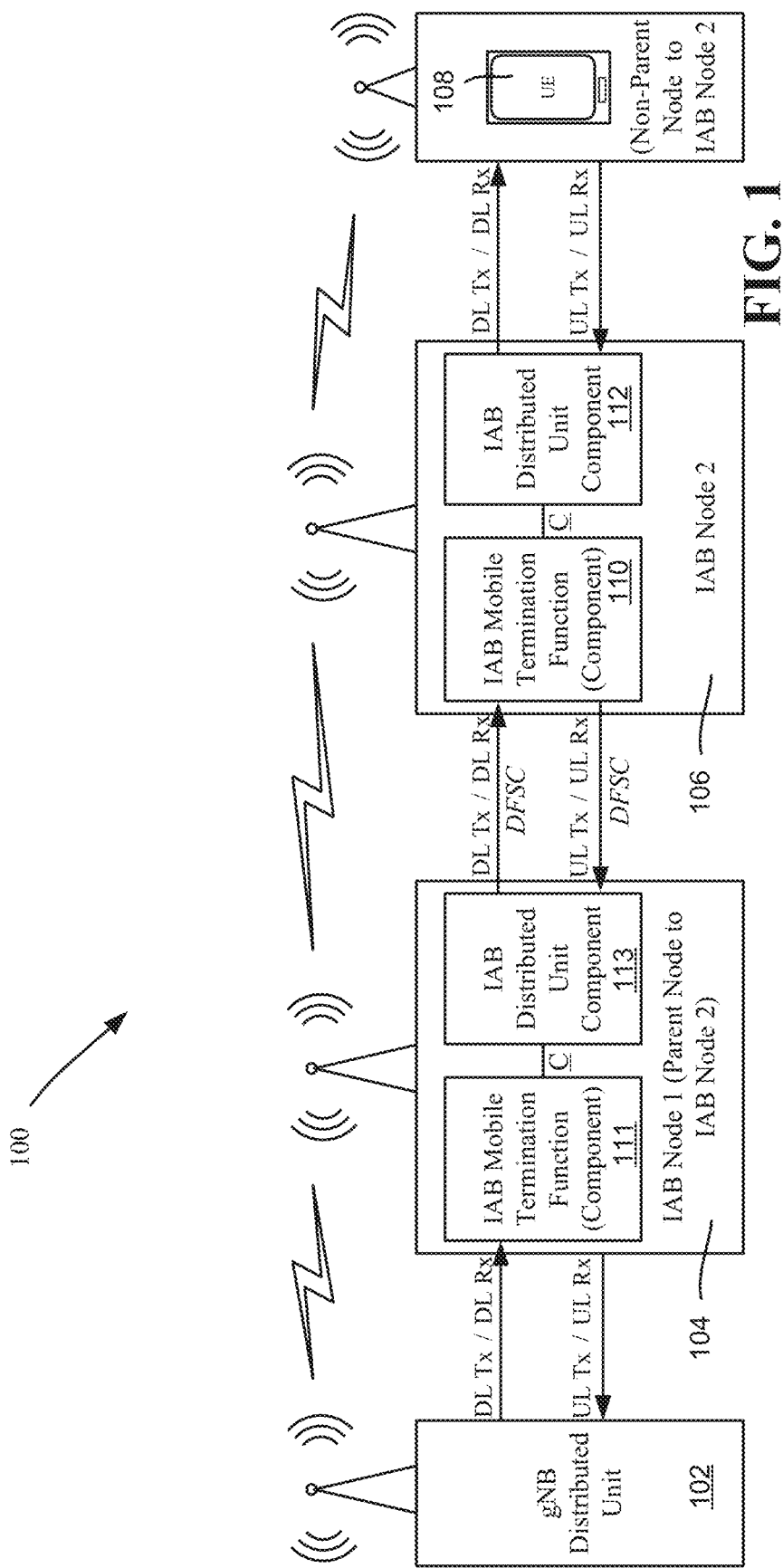
FIG. 1 illustrates an example wireless communication system in which one or more network node devices each act as an IAB node to relay data, in accordance with various aspects and implementations of the subject disclosure.

Briefly, one or more aspects of the technology described herein are generally directed towards performing dynamic resource coordination to support multi-hop layer-2/layer-3 based relaying for integrated access and backhaul (IAB) in New Radio (NR, often referred to as 5G) networks. For example, described herein is technology by which an IAB node and a serving parent node can dynamically adapt downlink/uplink resources used for access and backhaul links with wireless signaling.

For example, because traffic over the backhaul network can be dynamically varying, and usage of different downlink/uplink frame structure patterns on different hops can result in cross-link interference (CLI), it can be beneficial to adapt the frame structure of a given access or backhaul link at an IAB node on a dynamic basis, instead of using static or semi-static signaling or configuration mechanisms.

In one or more implementations, a parent node can schedule an IAB node, which communicates data over a semi-static frame structure corresponding to the scheduling. The parent node can then send an explicit dynamic frame structure coordination message to an IAB node, e.g., to free unused resources. In turn, the IAB node can reconfigure the frame structure into a modified frame structure, and communicate data over the modified frame structure. In this example, the IAB node can then use resources that would otherwise be unused. The IAB node can request a dynamic frame structure coordination message from the parent node. An implicit indication that the frame structure can be modified is also facilitated; e.g., when the parent node does not schedule the IAB node at an appropriate scheduling time, the IAB node recognizes that the semi-static frame structure can be reconfigured.

It should be understood that any of the examples and terms used herein are non-limiting. For instance, the examples are based on New Radio (NR, sometimes referred to as 5G) communications between a user equipment exemplified as a smartphone or the like and network devices/IAB nodes; however virtually any communications devices may benefit from the technology described herein, and/or their use in different spectrums may likewise benefit. Notwithstanding, these are non-limiting examples, and any of the embodiments, aspects, concepts, structures, functionalities or examples described herein are non-limiting, and the technology may be used in various ways that provide benefits and advantages in radio communications in general.

In some embodiments the non-limiting term "radio network node" or simply "network node," "radio network device or simply "network device" is used herein. These terms may be used interchangeably, and refer to any type of network node that serves user equipment and/or connected to other network node or network element or any radio node from where user equipment receives signal. Examples of radio network nodes are Node B, base station (BS), multi-standard radio (MSR) node such as MSR BS, gNodeB, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

In some embodiments the non-limiting term user equipment (UE) is used. It refers to any type of wireless device that communicates with a radio network node in a cellular or mobile communication system. Examples of user equipment are target device, device to device (D2D) user equipment, machine type user equipment or user equipment capable of machine to machine (M2M) communication, PDA, Tablet, mobile terminals, smart phone, laptop embedded equipped (LEE), laptop mounted equipment (LME), USB dongles etc.

Some embodiments are described in particular for 5G new radio systems. The embodiments are however applicable to any radio access technology (RAT) or multi-RAT system where the user equipment operates using multiple carriers e.g. LTE FDD/TDD, WCMDA/HSPA, GSM/GERAN, Wi Fi, WLAN, WiMax, CDMA2000 etc.

The embodiments are applicable to single carrier as well as to multicarrier (MC) or carrier aggregation (CA) operation of the user equipment. The term carrier aggregation (CA) is also called (e.g. interchangeably called) "multi-carrier system", "multi-cell operation", "multi-carrier operation", "multi-carrier" transmission and/or reception.

Note that the solutions outlined equally applies for Multi RAB (radio bearers) on some carriers (that is data plus speech is simultaneously scheduled).

FIG. 1 illustrates a wireless communication system comprising an IAB network 100, in which a gNB (gNodeB) node 102 communicates with an IAB node 1 104 (hop order 1). In the example of FIG. 1, the IAB node communicates with another IAB node 2 106 (hop order 2), which in turn communicates with a user equipment (UE) 108. As is specified in an IAB network such as the network 100, IAB nodes relay information on behalf of the user equipment 108 to (uplink) and from (downlink) a donor node, e.g., the GNb node 102. In general, a relay node can multiplex access and backhaul links in time, frequency, or space (e.g. beam-based operation).

In the example of FIG. 1, a route for relaying download data from the GNb 102 is from IAB node 1 (104) to IAB node 2 (labeled 106) to the user equipment 108. A route for relaying upload data from the user equipment 108 to the GNb node 102 is from IAB node 2 (106) to IAB node 1 (104).

Note that from the perspective of the IAB node 2 106, the IAB node 1 104 can be considered a parent node device to the IAB node 2 106, and the user equipment a non-parent node. From the perspective of the IAB node 1 104, the GNb node 102 can be considered a parent node device to the IAB node 1 104, and the IAB node 2 106 is a non-parent node. In other words, from any IAB node, the next node in the direction of the GNb node 102 (which can be the GNb node 102 itself) is the parent node, while the next node in the direction of the user equipment 108 (which can be the user equipment 108 itself) is the non-parent node. This terminology is used herein, in part because there may be any practical number of IAB nodes between the GNb node 102 and the user equipment, and any given IAB node need only couple to a parent node and a non-parent node.

Note that 5G mobile networks are deployed using a split RAN (radio access network) protocol architecture such that on the user plane the PDCP (packet data convergence protocol) sublayers reside at a centralized unit (CU), while the RLC (radio link control), MAC (medium access control) and PHY (physical) layers reside at the distributed unit (DU), which is the GNb node 102 in FIG. 1. User plane data is carried on Data Radio Bearers (DRBs) that traverse the user plane RAN protocol architecture. On the control plane, signaling radio bearers (SRBs) are set up that carry control messages from the RRC (radio resource control) layer and also utilize the PDCP layer at the CU, and are further carried down through the RLC, MAC, and PHY layers at the DU to be delivered to the UE over the air interface. Each network user can be allocated multiple DRBs and SRBs by the network. The network interface between the CU and DU is called the F1 interface (per 3GPP specifications).

As is known, an IAB node such as the IAB node 2 106 comprises two components (functions), including an IAB mobile termination (backhaul link) component 110 and an IAB distributed unit (access link) component 112. The IAB node 1 104 similarly comprises an IAB mobile termination (backhaul link) component 111 and an IAB distributed unit component 113. In general, the mobile termination (MT) component (e.g., 110) acts as a user equipment (IAB UE component) with respect to communications between the IAB node (e.g., 106) and its parent node (e.g., IAB node 108) by terminating the radio interface layers of the backhaul Uu interface, while the distributed unit component (e.g., 113) acts as an access point with respect to communications between the IAB node (e.g., 106) and its non-parent node (e.g., UE 108). An IAB mobile termination component (e.g., 110) can communicate via control plane messages (labeled C) to and from the IAB node's corresponding IAB distributed unit component (e.g., 112).

Figure 2:
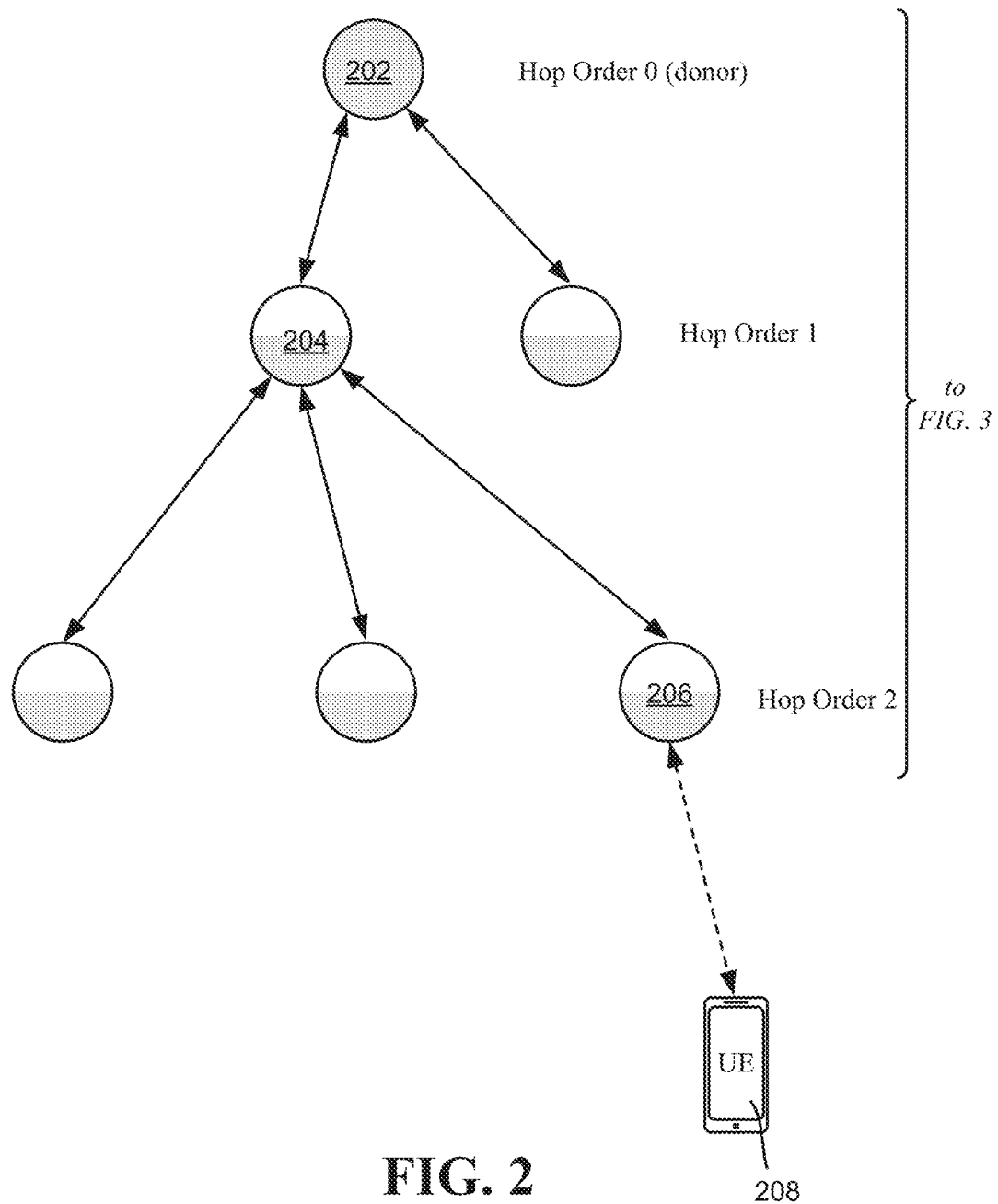
FIGS. 2 and 3 exemplify the concept of hops and associated integrated access and backhaul (IAB) frame structures based on the example of FIG. 1, along with communication of dynamic frame structure coordination messages, in accordance with various aspects and implementations of the subject disclosure.
Figure 3:
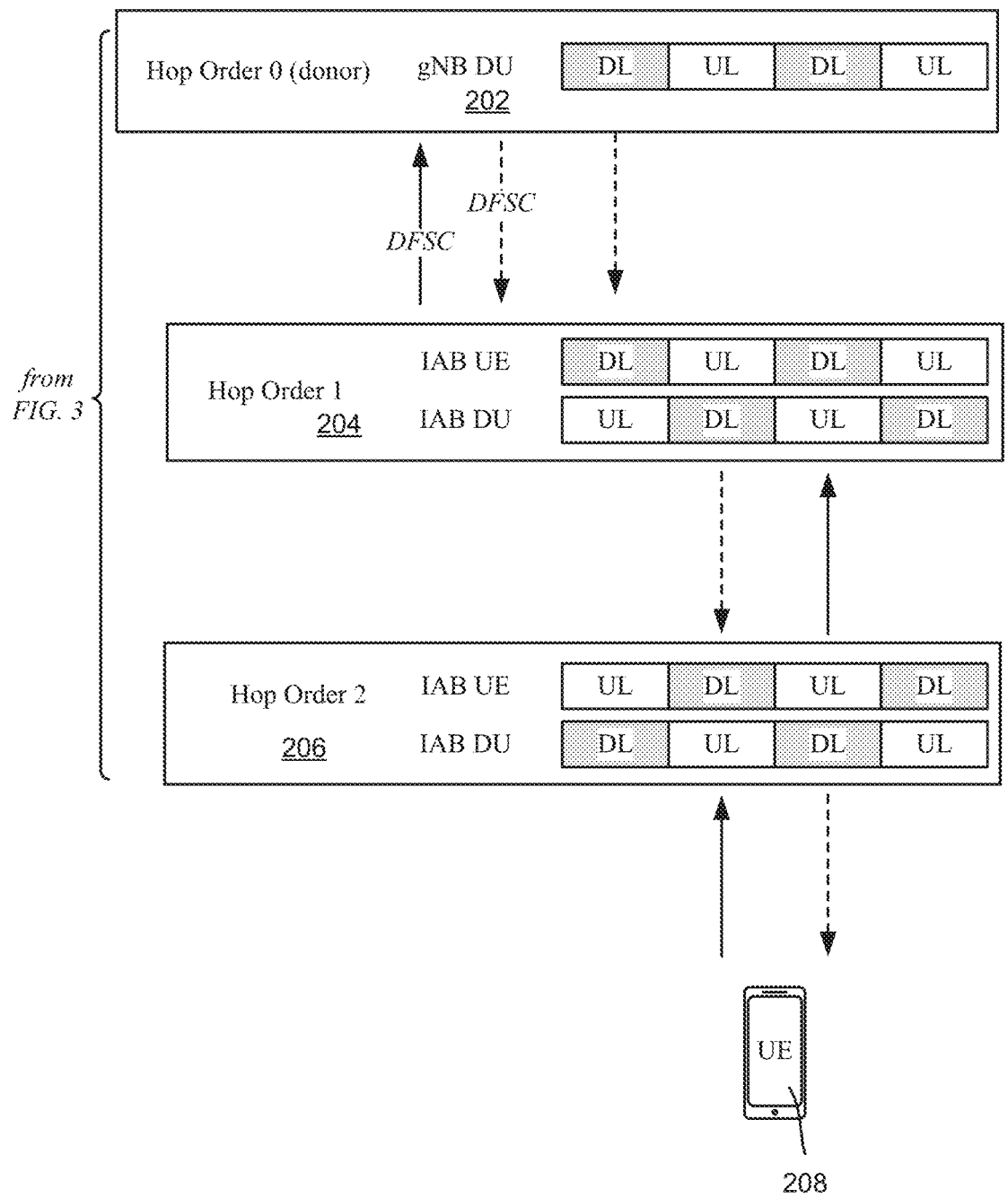

FIGS. 2 and 3 show a hierarchy of nodes 202, 204 and 206 and a user equipment 208 corresponding to nodes 102, 104 and 106 and user equipment 108 of FIG. 1, illustrating a hop order (FIG. 2) to the UE 208 and corresponding frame structures (FIG. 3). There can be different time/frequency partitions between the access and backhaul links. As shown in the frame structure design of FIG. 3 that supports multi-hop topologies (FIG. 2), a second order relay node 206 can transmit to the first order relay node 204 when the latter is receiving from the donor node 202 (hop 0). When the donor gNB (hop 0) node 202 sends download transmissions to the relay node 204 of hop order 1, the relay node 204 is receiving, and thus can schedule access UEs (an actual UE or a second order relay IAB node, e.g., 206, whose gNB it is) in the uplink.

The frame structure can be semi-statically coordinated across the IAB nodes via centralized or distributed coordination mechanisms. In one alternative, the frame structure coordination mechanisms can enable the partitioning of time slots and frequency resources across multiple backhaul hops to support orthogonal resources for access and backhaul links at a given IAB node. In another alternative, the frame structure coordination mechanisms can enable alignment of DL transmission with UL reception slots as well as alignment of DL reception with UL transmission slots at the IAB node.

In centralized coordination, one node determines the downlink/uplink frame structure for the relay nodes according to the IAB network topology and hop order of the nodes). For example the downlink/uplink frame structure can be semi-statically configured based on the hop order using RRC (radio resource control) signaling from the parent/donor IAB node to IAB node UE function, which internally coordinates using a control plane interface (IAB-C) to inform the IAB DU (distributed unit) function of the desired frame structure pattern. In another alternative, the downlink/uplink frame structure may be provided to the DU function via F1/OAM (Operation and Maintenance) messages over higher layer control plane signaling, which can be routed over one or more backhaul hops from a central unit (CU) or RAN (radio access network) controller. In yet another alternative the frame structure is provided by an anchor carrier (e.g., LTE or sub 6 GHz NR carrier) in the case of non-standalone (NSA) operation for IAB nodes.

In distributed coordination, each node only determines the downlink/uplink frame structure for the relay nodes that are connecting to it. With the relay nodes of each hop order determining the downlink/uplink frame structure for relays connecting to it, the downlink/uplink frame structure is determined for the whole topology. The coordination message signaling can be based on higher layer signaling, including system information broadcast, RRC from the parent node, modified F1 signaling, Backhaul RLC channel control signaling, or signaled via another carrier (e.g., via LTE or NR anchor carrier).

However, for both centralized and distributed coordination, depending on traffic load variations, route/topology updates, link interruption/failure events, QoS requirements, congestion/overload indications, or radio measurements including RSRP (reference signal received power), RSSI (received signal strength indication), RSRQ (received signal quality indication), and/or CLI (Cross-link interference) measurements, the available downlink/uplink resources shared between access and backhaul links at a given IAB node may be dynamically optimized. More particularly, with respect to dynamic resource coordination for IAB nodes, scheduled resources that would otherwise go unused with semi-static coordination can be used by dynamic resource coordination.

Figure 4:
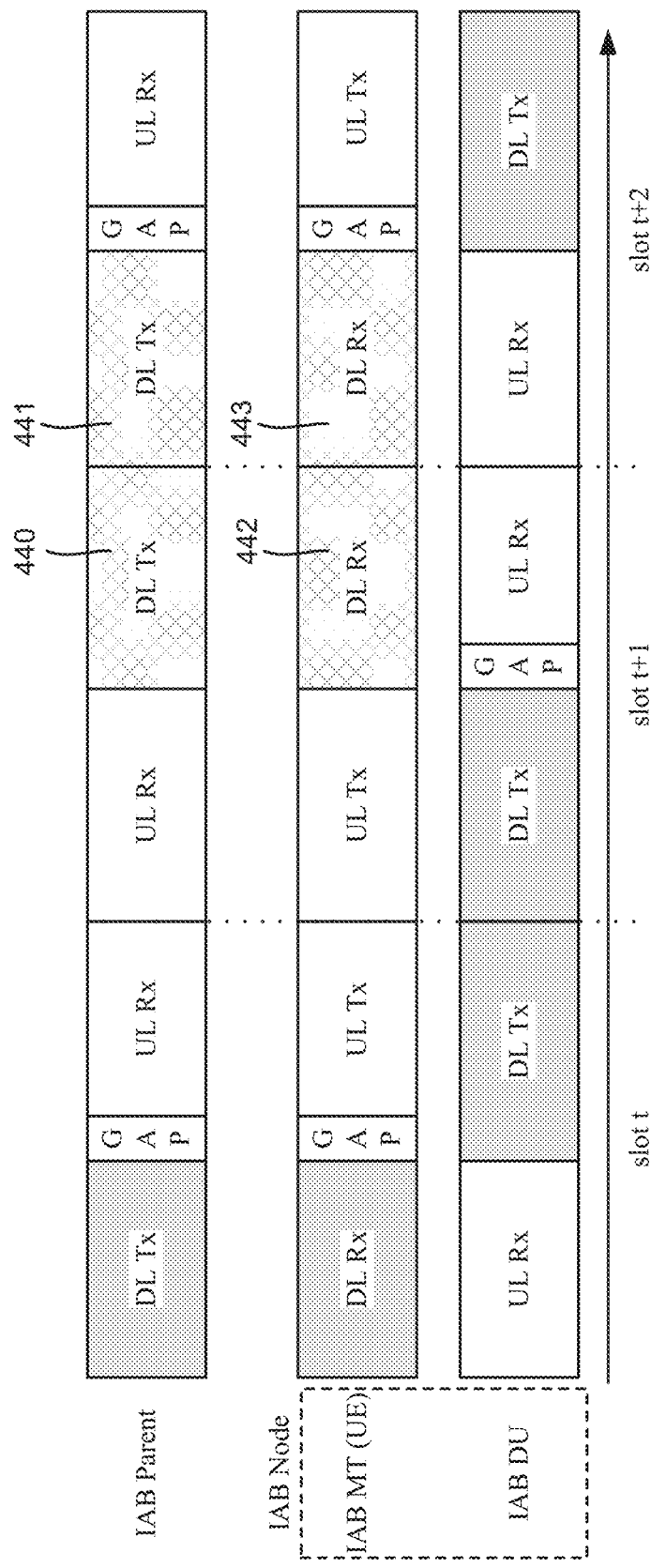
FIG. 4 illustrates an example IAB frame structure before any dynamic coordination, in accordance with various aspects and implementations of the subject disclosure.

By way of example, consider FIG. 4 (illustrating an IAB frame structure based on scheduling data prior to any dynamic coordination), the downlink communications (shaded blocks) and uplink communications (unshaded blocks) generally alternate to ensure the half-duplex constraint is maintained at the IAB node, e.g., the IAB node 106 (FIG. 1). In other words, the IAB node is never receiving and transmitting at the same time.

In this example, however, in the subframes 440 and 441 during slot t+1 and slot t+2, the IAB parent node does not have any downlink traffic to schedule (e.g., relay traffic) for the IAB node's UE function. However, because the frame structure is semi-statically coordinated, without dynamic coordination as described herein, the IAB DU, which is scheduled to receive data at blocks 442 and 443, cannot adapt the frame structure to allow downlink transmissions (to access UEs or other IAB nodes) because the IAB DU is not aware of the potential scheduling of the IAB parent node.

Figure 5:
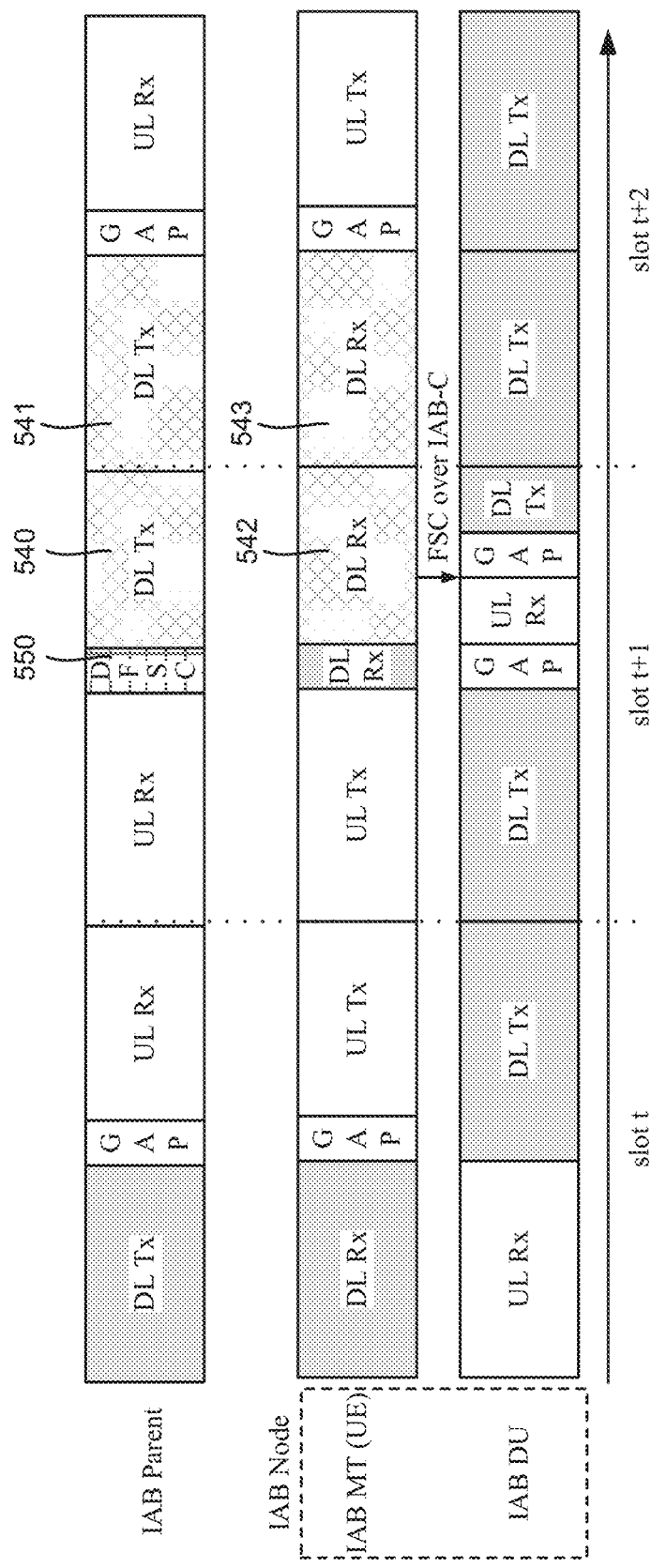
FIG. 5 illustrates an example IAB frame structure, based on FIG. 4, adapted via dynamic frame structure coordination, in accordance with various aspects and implementations of the subject disclosure.

As described herein, dynamic coordination allows the IAB parent and IAB node to perform dynamic frame structure coordination (DFSC). For example, as represented in FIG. 5, via DFSC, e.g., a message (labeled 550), the parent node indicates to the IAB UE component that a set of resources are available or released, overriding the semi-statically coordinated and configured downlink/uplink resource pattern. The IAB UE can then uses a frame structure coordination (FSC) control plane (IAB-C) message to indicate the dynamic update of the frame structure to enable the IAB DU to utilize those resources.

As can be seen, FIG. 5 is one example of dynamic frame structure signaling and coordination, where at the beginning of the downlink portion of slot t+1, the IAB parent node indicates that the remaining downlink resources in slot t+1 and slot t+2 are available for usage by the IAB DU for downlink transmissions, instead of uplink. Note that such downlink transmissions generally occur after some delay, which is determined based on the reception processing time at the IAB UE and scheduling processing time at the IAB DU.

Figure 6:
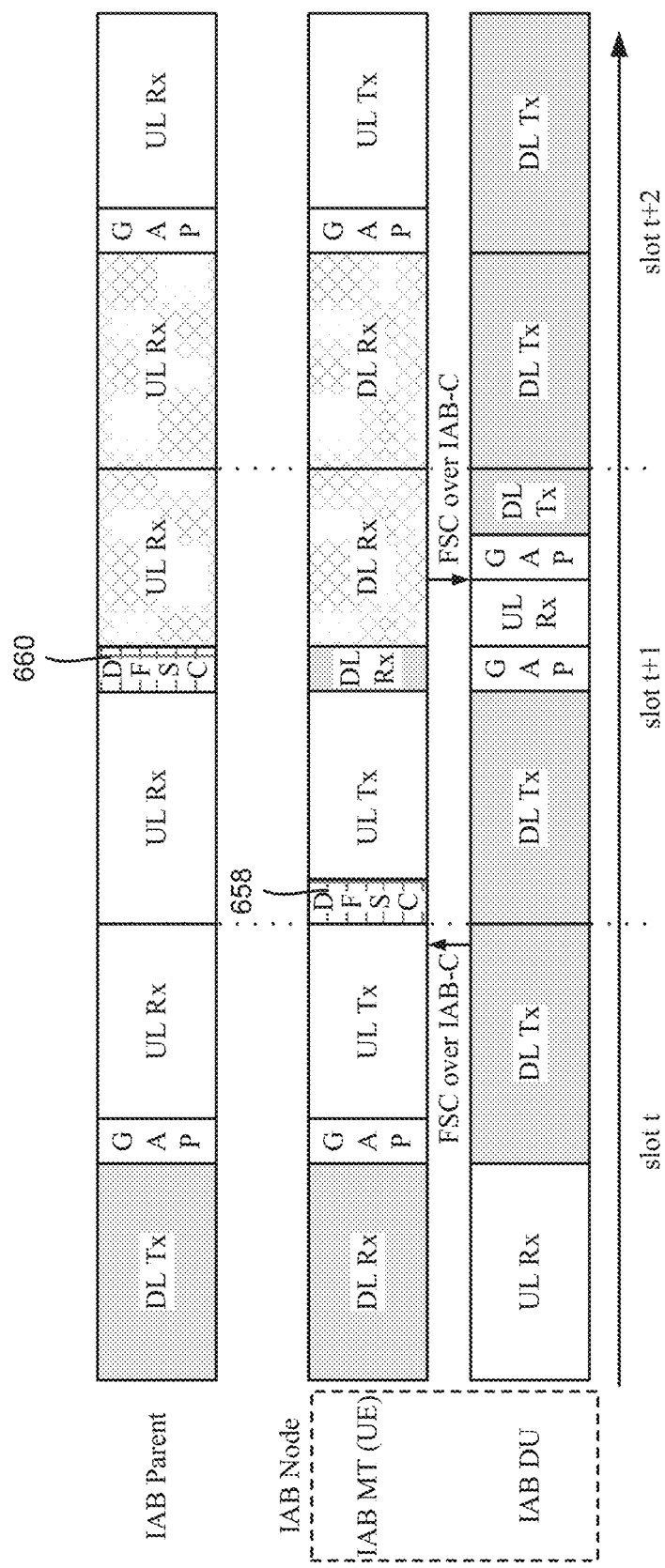
FIG. 6 illustrates an example IAB frame structure in which a distributed unit of an IAB node, via a mobile terminal of the IAB node, requests dynamic frame structure coordination, in accordance with various aspects and implementations of the subject disclosure.
Figure 7:
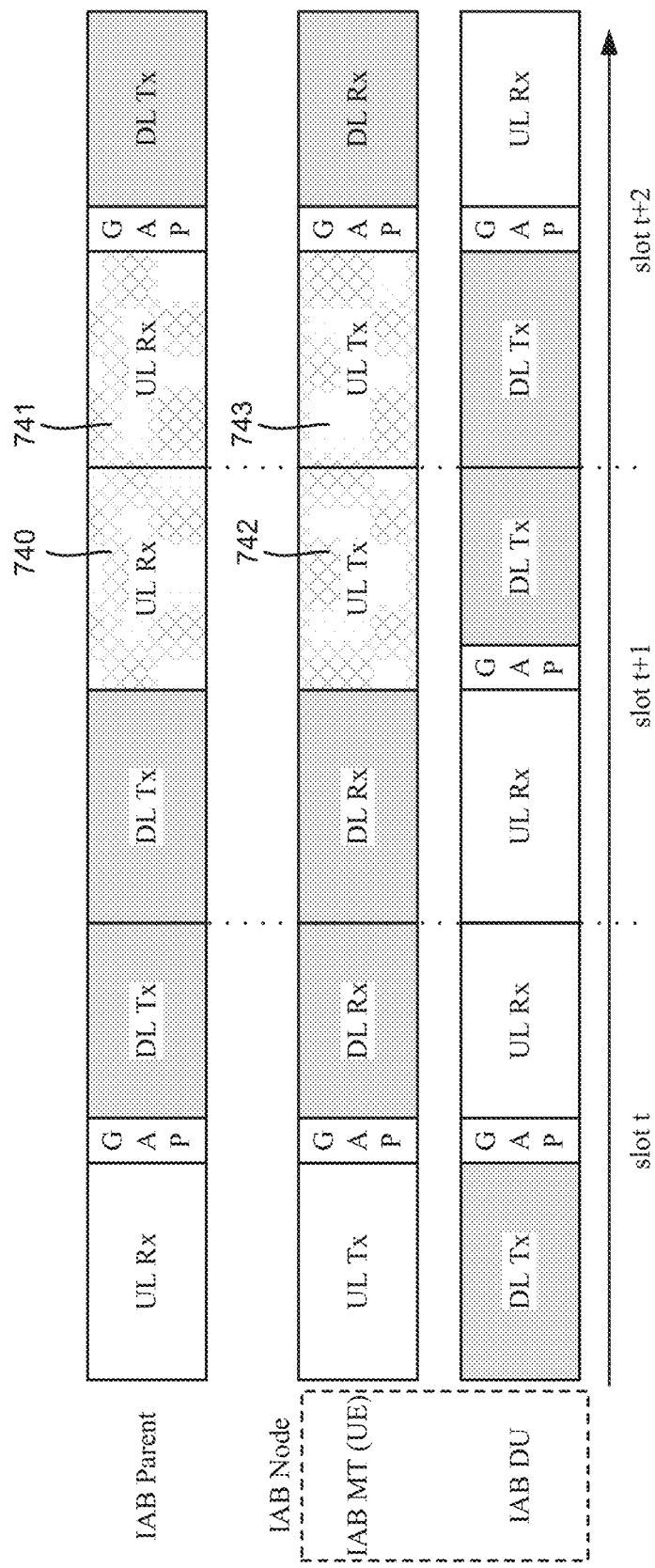
FIG. 7 illustrates an alternative example IAB frame structure before any dynamic coordination, in accordance with various aspects and implementations of the subject disclosure.
Figure 8:
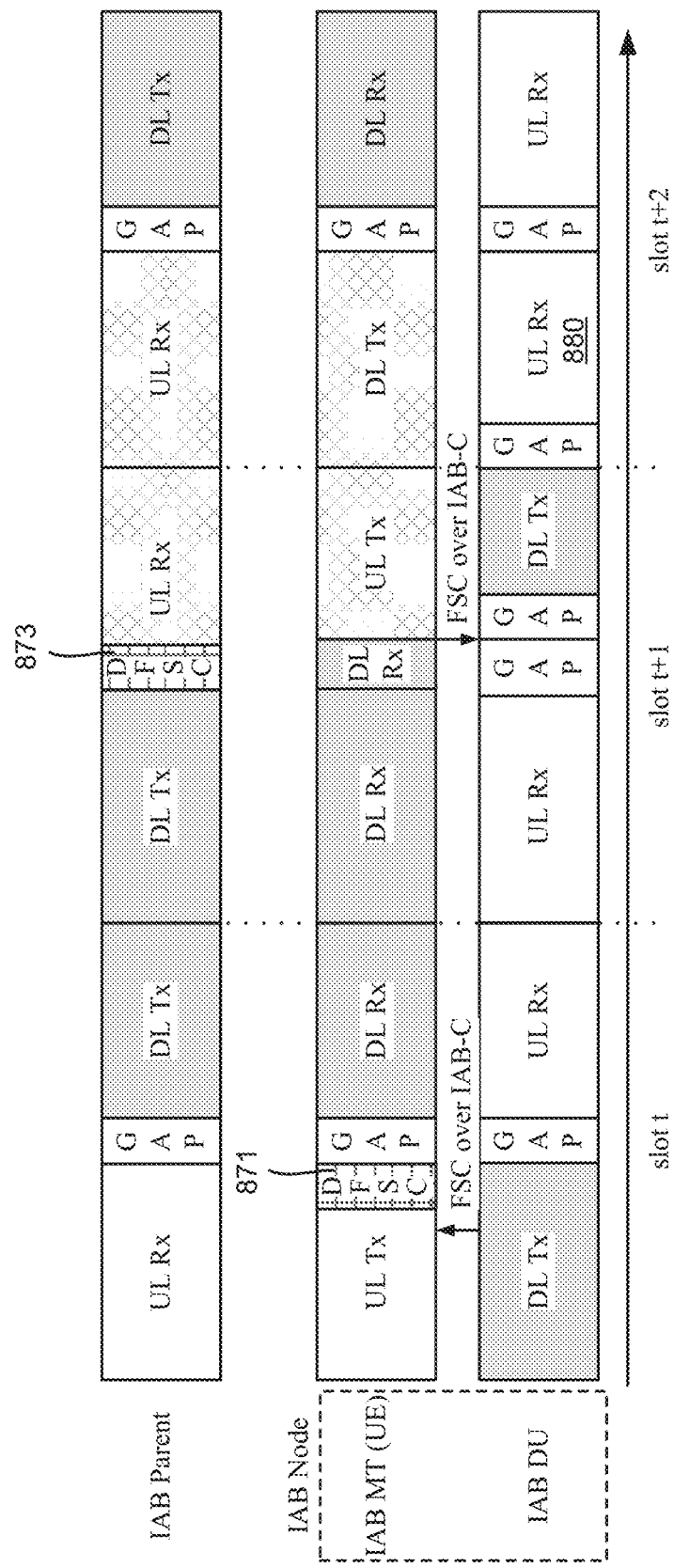
FIG. 8 illustrates an example IAB frame structure, based on FIG. 7, adapted via dynamic frame structure coordination as requested by a distributed unit of an IAB node, via a mobile terminal of the IAB node, in accordance with various aspects and implementations of the subject disclosure.

It may be beneficial for the IAB node to inform the parent node of available or requested downlink/uplink resources at the IAB DU. In this case the DFSC is provided over the IAB-C from the IAB DU to the IAB UE function. The IAB UE can then send the DFSC using an uplink control channel message to inform the set of available or requested resources. In one example the indication can be sent from the IAB node to the parent node via uplink control message (e.g., PUCCH, or physical uplink control channel), RACH (random access channel) preamble or message, or buffer status request (BSR) signaling. FIGS. 6-8 exemplify such a DFSC request.

As one example, as generally represented in FIG. 6, a DFSC request message (sent as represented by block 658) can be used for requesting resources to be reserved for downlink/uplink transmission by the IAB or parent node. Thus, for example, the DU component in FIG. 6 requests (via an FSC over IAB-C) that the UE component send a DFSC request to the parent node. In one alternative, the requesting node can utilize the resources after receiving an acknowledgment from the target (e.g., parent) node, (which can be a short DFSC message or some other acknowledgment recognized by the IAB node. In another alternative, the target node may send a rejection indication of the resource request, or may send an updated DFSC (e.g., block 660) with a subset of available resources from the set of requested resources.

FIGS. 7 and 8 show alternative scheduling corresponding to a frame structure (FIG. 7), and DFSC-based dynamic reconfiguration of the frame structure based on a DFSC request message (FIG. 8). In this example, in FIG. 8 the IAB DU requests (via an FSC over IAB-C) a subframe (one or more) in which to upload/receive some data from the non-parent node. In this example, the UE component of the IAB node determines that subframes (blocks 742 and 743) are not needed for uploading (transmitting) data to the parent, and requests (via request DFSC 871, received at the parent node) that one or more of the resources scheduled for upload transmission be freed or reconfigured (at least in part) for reception. Via DFSC 873, (which may be an acknowledgement to a proposed reconfiguration) and an FSC over IAB-C, the DU component is able to upload receive (block 880) in a subframe previously scheduled for transmission.

The set of resources indicated by the DFSC can also be used for interference (e.g., cross link interference, or CLI) mitigation, where the indicated resources include "flexible" for transmission by the target IAB or parent node depending on the level of interference that can be allowed (or not allowed) in those resources. The partitioning can be determined from CLI or other measurements of access and backhaul links, may correspond to one or more different interference level ranges (e.g., high/medium/low) and may be configured and indicated by the IAB node or parent node using higher layer or L1 signaling. In another alternative, the classification can be solely determined by the scheduling node with the metrics for classification left to the implementation of the scheduling node. The flexible resources can correspond to a set of one or more symbols or slots, which may be consecutive or not-consecutive in time. The pattern (including periodicity) of the flexible resources can be indicated with the DFSC or preconfigured by higher layer signaling.

The content of a DFSC can include multiple parameters for indicating the update frame structure and available downlink/uplink resources, such as provided in one or more of the following (non-limiting parameters):

TDD configuration index

Indication of the number of downlink and uplink symbols (jointly or independently)

Indication of the location or starting position of downlink and uplink symbols within a slot (jointly or independently)

Indication of control resource set (CORESET) duration and location within a slot Number of consecutive slots with available resources First slot index and time duration for the indicated available/reserved resources One or more sets of flexible resources potentially correspond to different configured or indicated interference levels DFSC type: resource release or resource request The set of available resources can be indicated to be contained within a single slot or across multiple consecutive slots. In addition, the resources can be indicated for consecutive or non-consecutive slots over a configurable period of time via semi-persistent scheduling/resource allocation. The pattern or set of slots for which the semi-persistent DFSC is provided can be configured by higher layer signaling along with a periodicity of the pattern.

Multiple mechanisms can be used for indicating the DFSC. In one alternative, the DFSC can be indicated by a new DCI (downlink control information) format defined for IAB resource coordination. In another alternative, the DFSC can be indicated by an L1 scheduling DCI, which provides dynamic UL/DL determination for a given resource allocation (e.g. one or more slots). In another alternative, the DFSC can utilize the group common (GC) PDCCH (physical downlink control channel) to indicate available resources from the parent node to the IAB node. In yet another alternative, the resources can be indicated via MAC (Medium Access Control) control element (CE), which can be beneficial in case of semi-persistent DFSC to indicate set(s) of available or requested downlink and/or uplink resources. The indication can be configured to be transmitted at the beginning of the slot in case of slot-based scheduling, or can occur at one or more symbols within a slot in case of non-slot based scheduling.

Although the examples thus far have described mechanisms from a downlink resource-centric perspective, it is understood that both downlink and uplink resources can be made available or requested by the parent node for the IAB nodes with joint or independent signaling.

In addition to explicit signaling of the downlink and uplink resources, e.g., via DFSC message(s), the indication of the DFSC can be implicit. For example, the DFSC can be indicated by reserved fields in a DCI or MAC CE message, or the release of resources can be indicated by the parent node by not sending regular downlink scheduling/resource allocation signaling (e.g., DCI or GC-PDCCH). When the IAB UE component does not detect the scheduling indication from the parent node, the IAB UE component recognizes this as an implicit DFSC, and can inform the DU component that a given set of downlink/uplink resources are available until the next configured scheduling instance (e.g., for the current slot).

As can be seen, the technology described herein supports multiplexing of access and backhaul traffic across multiple hops of a wireless backhaul network while maintaining a half-duplex constraint at a given IAB node. The technology enables efficient utilization of radio resources by enabling dynamic adaptation of available downlink/uplink resources for access and backhaul links between an IAB node and donor/parent IAB nodes. The technology provides an indication of available resources that can be used for slot, non-slot, and multi-slot scheduling. The technology allows flexible patterns of downlink/uplink resources to be coordinated across a backhaul link including semi-persistent resource allocation.

Figure 9:
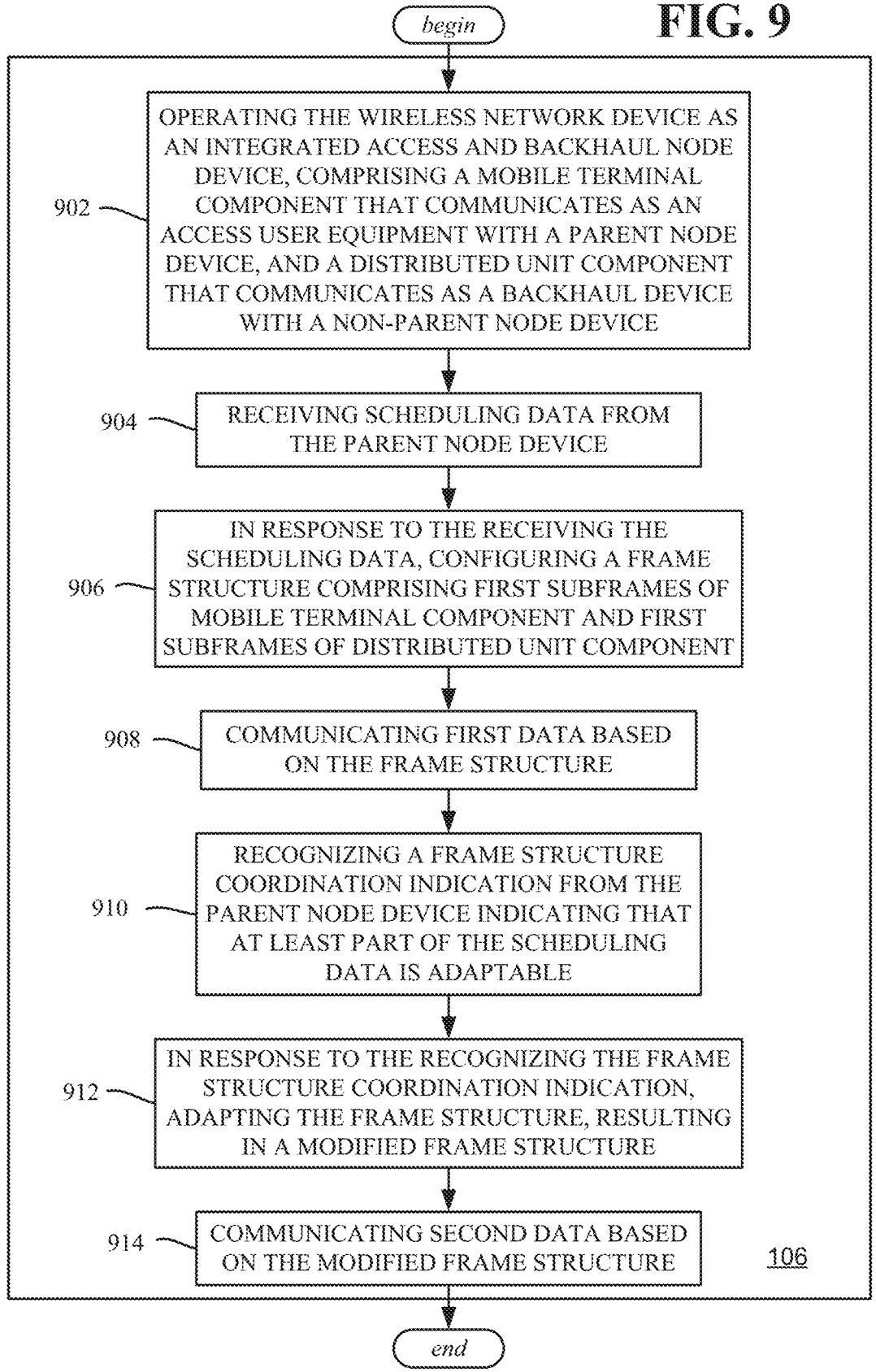
FIG. 9 is a flow diagram representing example operations of an IAB node with respect to dynamic frame structure coordination, in accordance with various aspects and implementations of the subject disclosure.

FIG. 9 is directed towards a wireless network device, such as comprising a processor, and a memory that stores executable instructions that, when executed by the processor, facilitate performance of operations. Example operations comprise operation 902, which represents operating the wireless network device as an integrated access and backhaul node device (e.g., 106), the integrated access and backhaul node device comprising a mobile termination function that communicates as an access user equipment with a parent node device, and a distributed unit component that communicates as a backhaul device with a non-parent node device. Operation 904 represents receiving scheduling data from the parent node device. Operation 906 represents, in response to the receiving the scheduling data, configuring a frame structure comprising first subframes of mobile termination function and first subframes of distributed unit component. Operation 908 represents communicating first data based on the frame structure. Operation 910 represents recognizing a frame structure coordination indication from the parent node device indicating that at least part of the scheduling data is adaptable. Operation 912 represents, in response to the recognizing the frame structure coordination indication, adapting the frame structure, resulting in a modified frame structure. Operation 914 represents communicating second data based on the modified frame structure.

Further instructions can comprise, requesting the frame structure coordination indication from the parent node device. Recognizing the frame structure coordination indication from the parent node device indicating that at least the part of the scheduling data is adaptable can comprise receiving an explicit frame structure coordination message from the parent node device.

Configuring the frame structure can comprise configuring a first mobile termination function subframe for mobile termination function upload transmission to the parent node device, configuring a first distributed unit subframe for distributed unit download transmission to the non-parent node device, configuring a second mobile termination function subframe for mobile termination function download reception from the parent node device, and configuring a second distributed unit subframe for distributed unit upload reception from the non-parent node device. Adapting the frame structure can comprise reconfiguring the second distributed unit subframe for the distributed unit download transmission to the non-parent node device.

Configuring the frame structure can comprise configuring a first mobile termination function subframe for mobile termination function download reception from the parent node device, configuring a first distributed unit subframe for distributed unit upload reception from the non-parent node device, configuring a second mobile termination function subframe for mobile termination function upload transmission to the parent node device, and configuring a second distributed unit subframe for distributed unit download transmission to the non-parent node device. Adapting the frame structure can comprise reconfiguring the second distributed unit subframe for the distributed unit upload reception from the non-parent node device.

The frame structure coordination indication from the parent node device can specify reconfiguration information, and adapting the frame structure can comprise reconfiguring the frame structure based on the reconfiguration information.

Recognizing the frame structure coordination indication from the parent node device indicating that at least the part of the scheduling data is adaptable can comprise receiving a frame structure coordination message at the mobile termination function; further instructions can comprise sending a control message, based on the frame structure coordination indication, from the mobile termination function to the distributed unit component.

Further instructions can comprise receiving a control indication at the mobile termination function from the distributed unit component, and based on the control indication, requesting, by the mobile termination function, the frame structure coordination indication from the parent node device.

Figure 10:
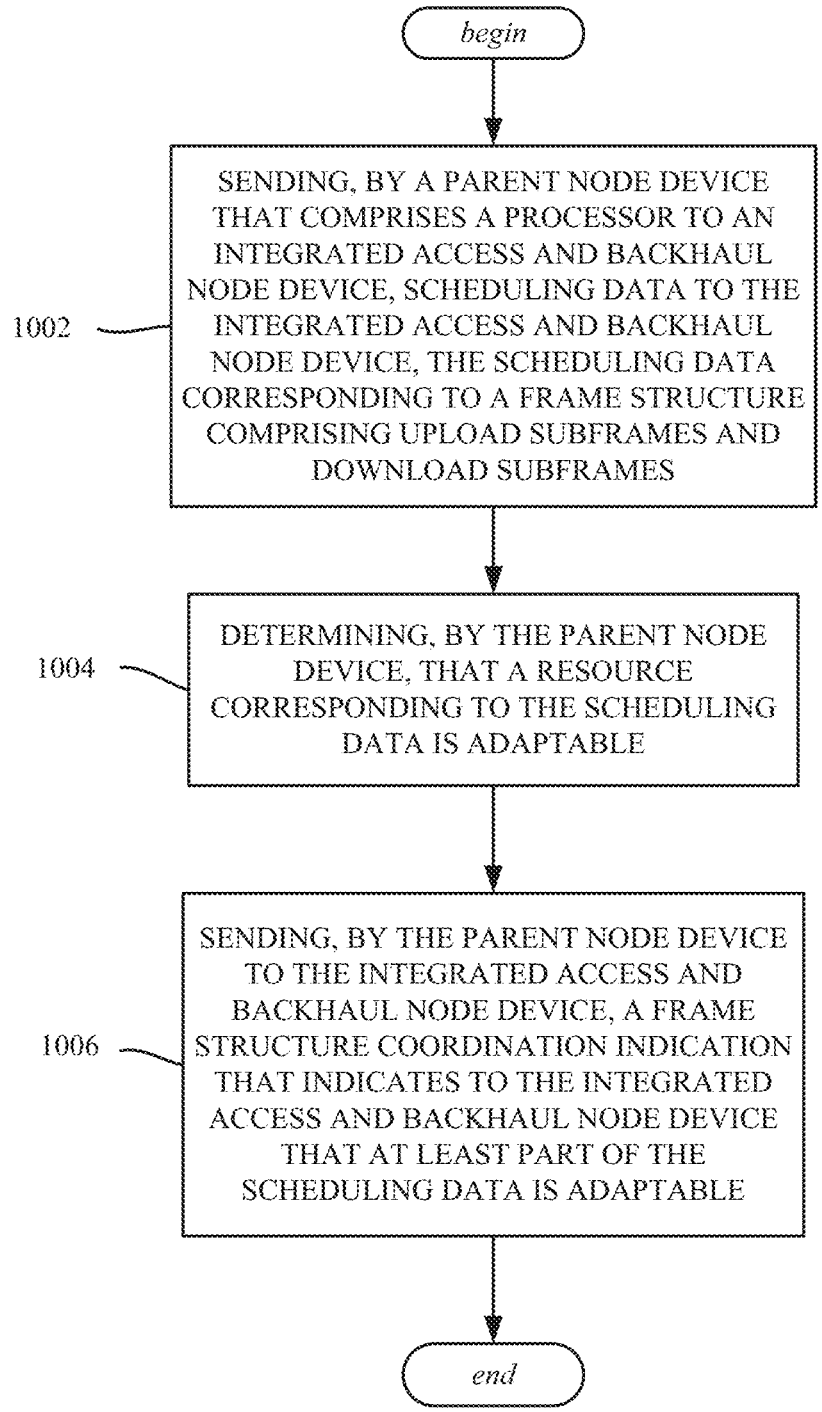
FIG. 10 is a flow diagram representing example operations of a parent node to an IAB node with respect to dynamic frame structure coordination, in accordance with various aspects and implementations of the subject disclosure.

One or more aspects are represented in FIG. 10, and can comprise example operations, including sending (operation 1002), by a parent node device that comprises a processor to an integrated access and backhaul node device, scheduling data to the integrated access and backhaul node device, the scheduling data corresponding to a frame structure comprising upload subframes and download subframes. Operation 1004 represents determining, by the parent node device, that a resource corresponding to the scheduling data is adaptable. Operation 1004 represents sending, by the parent node device to the integrated access and backhaul node device, a frame structure coordination indication that indicates to the integrated access and backhaul node device that at least part of the scheduling data is adaptable.

Determining, at the parent node device, that the resource corresponding to the scheduling data is adaptable can comprise determining that no download data is to be transmitted to the integrated access and backhaul node device in a subframe scheduled for the download transmission to the integrated access and backhaul node device.

Aspects can comprise receiving, by the parent node device, a request from the integrated access and backhaul node device for the frame structure coordination indication; sending the frame structure coordination indication can comprise sending a frame structure coordination message to the integrated access and backhaul node device in response to the receiving the request.

Sending the frame structure coordination indication can comprise sending information that frees the resource corresponding to the scheduling data. Sending the frame structure coordination indication can comprise sending a frame structure coordination message specifying reconfiguration information that modifies the scheduling data and frame structure corresponding to the scheduling data.

Figure 11:
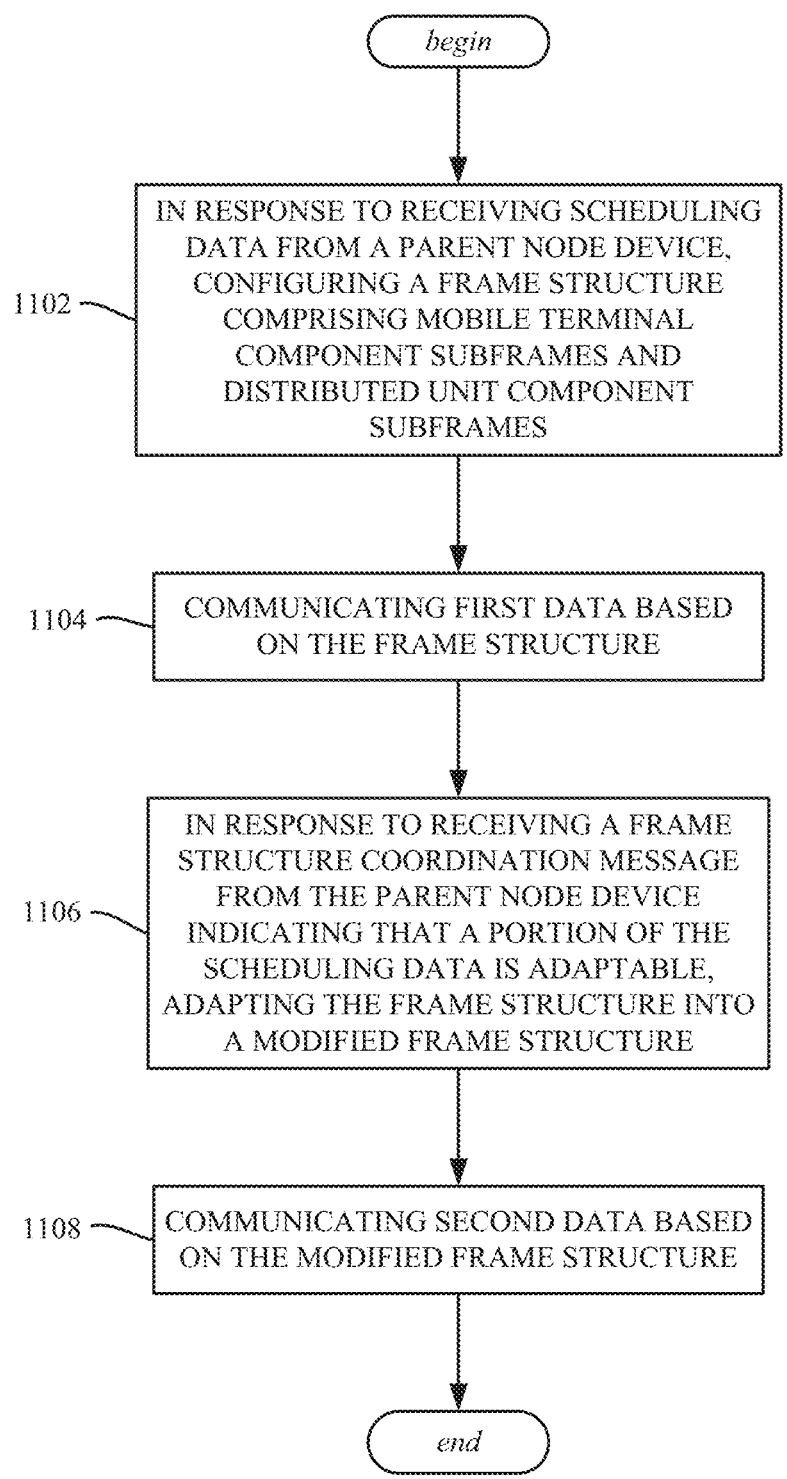
FIG. 11 is a flow diagram representing example operations of an IAB node with respect to dynamic frame structure coordination, in accordance with various aspects and implementations of the subject disclosure.

FIG. 11 represents example operations, such as performed via a machine-readable storage medium, comprising executable instructions that, when executed by a processor of an integrated access and backhaul node device, facilitate performance of those operations. Operation 1102 comprises, in response to receiving scheduling data from a parent node device, configuring a frame structure comprising mobile termination function subframes and distributed unit component subframes. Operation 1104 comprises communicating first data based on the frame structure. Operation 1106 comprises in response to receiving a frame structure coordination message from the parent node device indicating that a portion of the scheduling data is adaptable, adapting the frame structure into a modified frame structure. Operation 1108 comprises communicating second data based on the modified frame structure.

Configuring the frame structure can comprise configuring a mobile terminal subframe for mobile terminal upload transmission to the parent node device, configuring a distributed unit subframe for distributed unit download transmission to the non-parent node device; adapting the frame structure into the modified frame structure can comprise reconfiguring the distributed unit subframe for distributed unit upload reception from the non-parent node device.

Configuring the frame structure can comprise configuring a mobile terminal subframe for mobile terminal download reception from the parent node device, configuring a distributed unit subframe for distributed unit upload reception from the non-parent node device; adapting the frame structure into the modified frame structure can comprise reconfiguring the distributed unit subframe for distributed unit download transmission to the non-parent node device.

The frame structure coordination message from the parent node device can be received at a mobile termination function of the integrated access and backhaul node device, and further operations can comprise sending a control indication, based on the frame structure coordination message, from the mobile termination function to a distributed unit component of the integrated access and backhaul node device.

Further operations can comprise sending a control message from a distributed unit component of the integrated access and backhaul node device to a mobile termination function of the integrated access and backhaul node device, and based on the control message, sending a request for the frame structure coordination message from the mobile termination function to the parent node device.

As can be seen, the technology described herein supports multiplexing of access and backhaul traffic across multiple hops of a wireless backhaul network, while maintaining a half-duplex constraint at a given JAB node. The technology facilitates efficient utilization of radio resources by enabling dynamic adaptation of available downlink and uplink resources for access and backhaul links between an JAB node and a donor/parent JAB nodes. The providing of an indication of available resources can be used for slot, non-slot, and multi-slot scheduling. The technology allows flexible patterns of downlink and uplink resources to be coordinated across a backhaul link, including semi-persistent resource allocation.

A wireless communication system can employ various cellular systems, technologies, and modulation schemes to facilitate wireless radio communications between devices (e.g., a UE and the network device). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network device) of the system are configured to communicate wireless signals using one or more multi carrier modulation schemes, wherein data symbols can be transmitted simultaneously over multiple frequency sub-carriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

Figure 12:
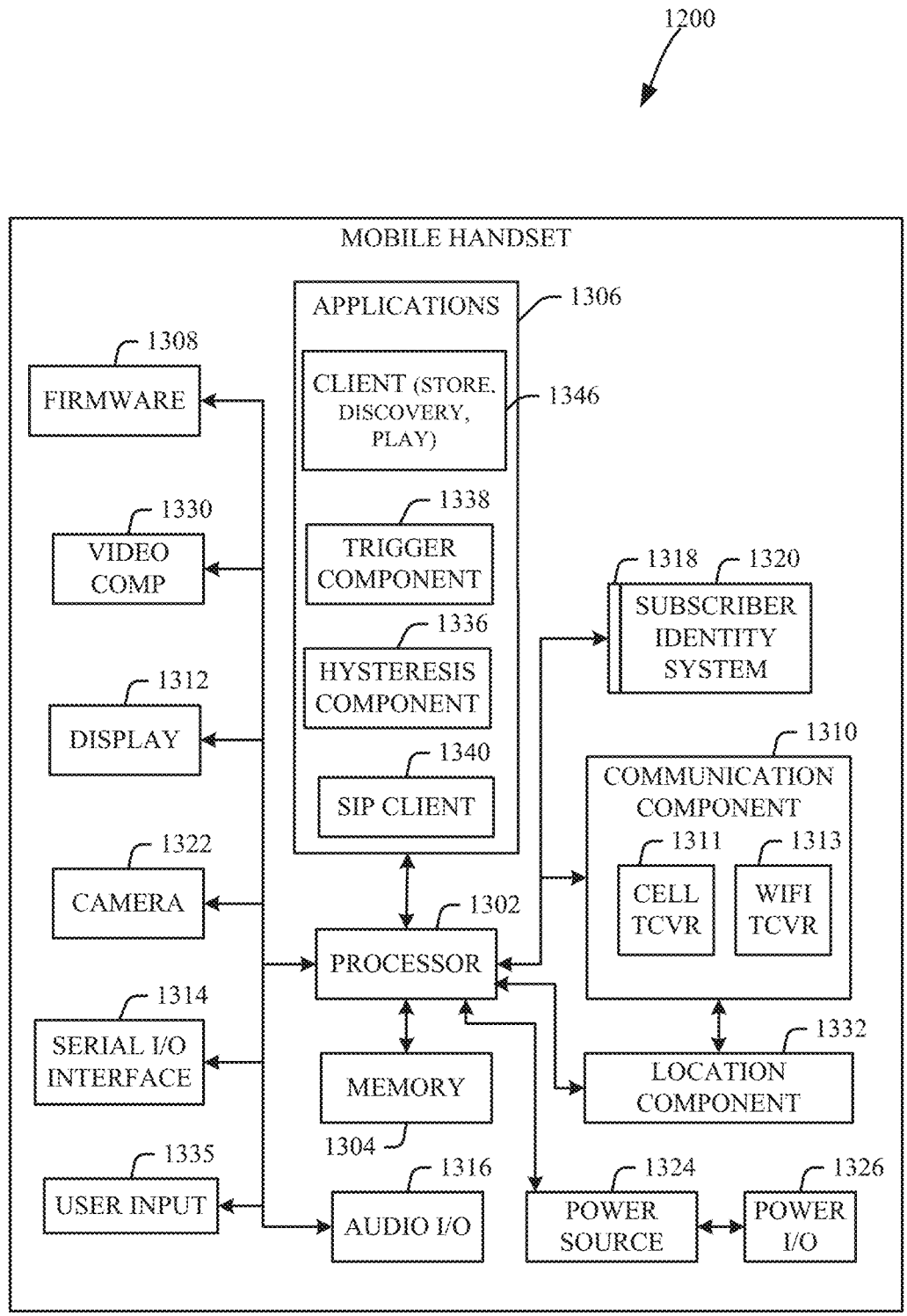
FIG. 12 illustrates an example block diagram of an example mobile handset operable to engage in a system architecture that facilitates wireless communications according to one or more embodiments described herein.

Referring now to FIG. 12, illustrated is an example block diagram of an example mobile handset 1200 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 1202 for controlling and processing all onboard operations and functions. A memory 1204 interfaces to the processor 1202 for storage of data and one or more applications 1206 (e.g., a video player software, user feedback component software, etc.). Other applications can include voice recognition of predetermined voice commands that facilitate initiation of the user feedback signals. The applications 1206 can be stored in the memory 1204 and/or in a firmware 1208, and executed by the processor 1202 from either or both the memory 1204 or/and the firmware 1208. The firmware 1208 can also store startup code for execution in initializing the handset 1200. A communications component 1210 interfaces to the processor 1202 to facilitate wired/wireless communication with external systems, e.g., cellular networks, VoIP networks, and so on. Here, the communications component 1210 can also include a suitable cellular transceiver 1211 (e.g., a GSM transceiver) and/or an unlicensed transceiver 1213 (e.g., Wi-Fi, WiMax) for corresponding signal communications. The handset 1200 can be a device such as a cellular telephone, a PDA with mobile communications capabilities, and messaging-centric devices. The communications component 1210 also facilitates communications reception from terrestrial radio networks (e.g., broadcast), digital satellite radio networks, and Internet-based radio services networks The handset 1200 includes a display 1212 for displaying text, images, video, telephony functions (e.g., a Caller ID function), setup functions, and for user input. For example, the display 1212 can also be referred to as a "screen" that can accommodate the presentation of multimedia content (e.g., music metadata, messages, wallpaper, graphics, etc.). The display 1212 can also display videos and can facilitate the generation, editing and sharing of video quotes. A serial I/O interface 1214 is provided in communication with the processor 1202 to facilitate wired and/or wireless serial communications (e.g., USB, and/or IEEE 1294) through a hardwire connection, and other serial input devices (e.g., a keyboard, keypad, and mouse). This supports updating and troubleshooting the handset 1200, for example. Audio capabilities are provided with an audio I/O component 1216, which can include a speaker for the output of audio signals related to, for example, indication that the user pressed the proper key or key combination to initiate the user feedback signal. The audio I/O component 1216 also facilitates the input of audio signals through a microphone to record data and/or telephony voice data, and for inputting voice signals for telephone conversations.

The handset 1200 can include a slot interface 1218 for accommodating a SIC (Subscriber Identity Component) in the form factor of a card Subscriber Identity Module (SIM) or universal SIM 1220, and interfacing the SIM card 1220 with the processor 1202. However, it is to be appreciated that the SIM card 1220 can be manufactured into the handset 1200, and updated by downloading data and software.

The handset 1200 can process IP data traffic through the communications component 1210 to accommodate IP traffic from an IP network such as, for example, the Internet, a corporate intranet, a home network, a person area network, etc., through an ISP or broadband cable provider. Thus, VoIP traffic can be utilized by the handset 1200 and IP-based multimedia content can be received in either an encoded or a decoded format.

A video processing component 1222 (e.g., a camera) can be provided for decoding encoded multimedia content. The video processing component 1222 can aid in facilitating the generation, editing, and sharing of video quotes. The handset 1200 also includes a power source 1224 in the form of batteries and/or an AC power subsystem, which power source 1224 can interface to an external power system or charging equipment (not shown) by a power I/O component 1226.

The handset 1200 can also include a video component 1230 for processing video content received and, for recording and transmitting video content. For example, the video component 1230 can facilitate the generation, editing and sharing of video quotes. A location tracking component 1232 facilitates geographically locating the handset 1200. As described hereinabove, this can occur when the user initiates the feedback signal automatically or manually. A user input component 1234 facilitates the user initiating the quality feedback signal. The user input component 1234 can also facilitate the generation, editing and sharing of video quotes. The user input component 1234 can include such conventional input device technologies such as a keypad, keyboard, mouse, stylus pen, and/or touch screen, for example.

Referring again to the applications 1206, a hysteresis component 1236 facilitates the analysis and processing of hysteresis data, which is utilized to determine when to associate with the access point. A software trigger component 1238 can be provided that facilitates triggering of the hysteresis component 1236 when the Wi-Fi transceiver 1213 detects the beacon of the access point. A SIP client 1240 enables the handset 1200 to support SIP protocols and register the subscriber with the SIP registrar server. The applications 1206 can also include a client 1242 that provides at least the capability of discovery, play and store of multimedia content, for example, music.

The handset 1200, as indicated above related to the communications component 1210, includes an indoor network radio transceiver 1213 (e.g., Wi-Fi transceiver). This function supports the indoor radio link, such as IEEE 802.11, for the dual-mode GSM handset 1200. The handset 1200 can accommodate at least satellite radio services through a handset that can combine wireless voice and digital radio chipsets into a single handheld device.

Figure 13:
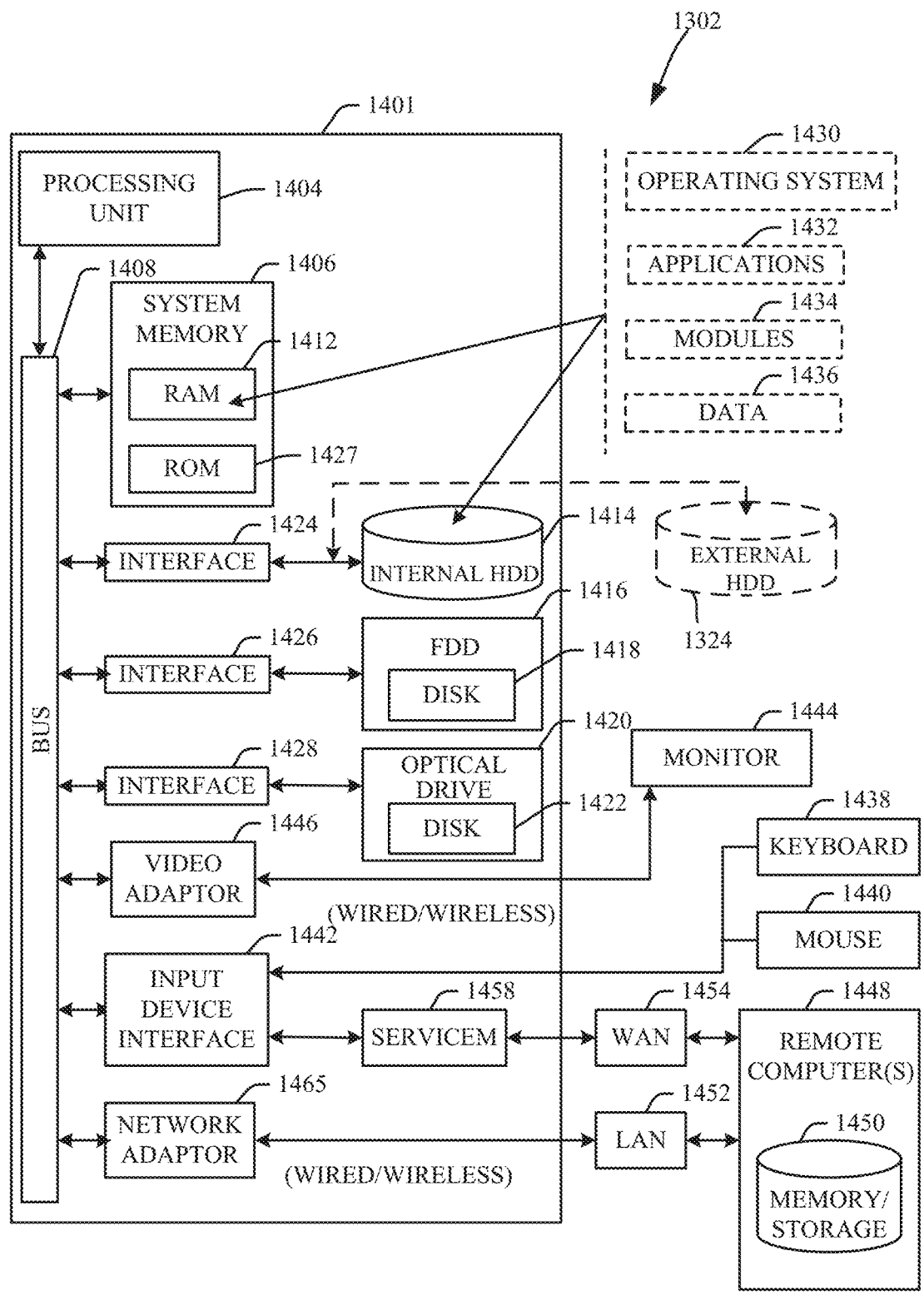
FIG. 13 illustrates an example block diagram of an example computer operable to engage in a system architecture that facilitates wireless communications according to one or more embodiments described herein.

Referring now to FIG. 13, illustrated is an example block diagram of an example computer 1300 operable to engage in a system architecture that facilitates wireless communications according to one or more embodiments described herein. The computer 1300 can provide networking and communication capabilities between a wired or wireless communication network and a server (e.g., Microsoft server) and/or communication device. In order to provide additional context for various aspects thereof, FIG. 13 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below with reference to FIG. 13 is but one example of a computing device.

In order to provide a context for the various aspects of the disclosed subject matter, FIG. 13 and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1320 (see below), non-volatile memory 1322 (see below), disk storage 1324 (see below), and memory storage 1346 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 13 illustrates a block diagram of a computing system 1300 operable to execute the disclosed systems and methods in accordance with an embodiment. Computer 1312, which can be, for example, part of the hardware of system 1320, includes a processing unit 1314, a system memory 1316, and a system bus 1318. System bus 1318 couples system components including, but not limited to, system memory 1316 to processing unit 1314. Processing unit 1314 can be any of various available processors. Dual microprocessors and other multiprocessor architectures also can be employed as processing unit 1314.

System bus 1318 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

System memory 1316 can include volatile memory 1320 and nonvolatile memory 1322. A basic input/output system (BIOS), containing routines to transfer information between elements within computer 1312, such as during start-up, can be stored in nonvolatile memory 1322. By way of illustration, and not limitation, nonvolatile memory 1322 can include ROM, PROM, EPROM, EEPROM, or flash memory. Volatile memory 1320 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1312 can also include removable/non-removable, volatile/non-volatile computer storage media. FIG. 13 illustrates, for example, disk storage 1324. Disk storage 1324 includes, but is not limited to, devices like a magnetic disk drive, floppy disk drive, tape drive, flash memory card, or memory stick. In addition, disk storage 1324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to system bus 1318, a removable or non-removable interface is typically used, such as interface 1326.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 13 describes software that acts as an intermediary between users and computer resources described in suitable operating environment 1300. Such software includes an operating system 1328. Operating system 1328, which can be stored on disk storage 1324, acts to control and allocate resources of computer system 1312. System applications 1330 take advantage of the management of resources by operating system 1328 through program modules 1332 and program data 1334 stored either in system memory 1316 or on disk storage 1324. It is to be noted that the disclosed subject matter can be implemented with various operating systems or combinations of operating systems.

A user can enter commands or information into computer 1312 through input device(s) 1336. As an example, a mobile device and/or portable device can include a user interface embodied in a touch sensitive display panel allowing a user to interact with computer 1312. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1314 through system bus 1318 by way of interface port(s) 1338. Interface port(s) 1338 include, for example, a serial port, a parallel port, a game port, a universal serial bus (USB), an infrared port, a Bluetooth port, an IP port, or a logical port associated with a wireless service, etc. Output device(s) 1340 and a move use some of the same type of ports as input device(s) 1336.

Thus, for example, a USB port can be used to provide input to computer 1312 and to output information from computer 1312 to an output device 1340. Output adapter 1342 is provided to illustrate that there are some output devices 1340 like monitors, speakers, and printers, among other output devices 1340, which use special adapters. Output adapters 1342 include, by way of illustration and not limitation, video and sound cards that provide means of connection between output device 1340 and system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. Remote computer(s) 1344 can be a personal computer, a server, a router, a network PC, cloud storage, cloud service, a workstation, a microprocessor based appliance, a peer device, or other common network node and the like, and typically includes many or all of the elements described relative to computer 1312.

For purposes of brevity, only a memory storage device 1346 is illustrated with remote computer(s) 1344. Remote computer(s) 1344 is logically connected to computer 1312 through a network interface 1348 and then physically connected by way of communication connection 1350. Network interface 1348 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1350 refer(s) to hardware/software employed to connect network interface 1348 to bus 1318. While communication connection 1350 is shown for illustrative clarity inside computer 1312, it can also be external to computer 1312. The hardware/software for connection to network interface 1348 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A network node device, comprising:
a processor, and
a memory that stores executable instructions that, when executed by the processor, facilitate performance of operations, the operations comprising:
recognizing an implicit indication from a parent node device indicating that at least a part of scheduling data received previously is adaptable;
in response to the recognizing of the implicit indication, adapting a frame structure previously employed for a mobile termination function to communicate as an access user equipment with the parent node device and previously employed for a distributed unit function to communicate as a backhaul device with a non-parent node device, resulting in a modified frame structure; and
communicating data based on the modified frame structure comprising subframes of the mobile termination function and subframes of the distributed unit function.

2. The network node device of claim 1, wherein the implicit indication comprises the parent node device not scheduling a resource allocation for the network node device at a defined scheduling time.

3. The network node device of claim 1, wherein the frame structure comprises a first mobile terminal subframe for mobile terminal upload transmission to the parent node device, a first distributed unit subframe for distributed unit download transmission to the non-parent node device, a second mobile terminal subframe for mobile terminal download reception from the parent node device, and a second distributed unit subframe for distributed unit upload reception from the non-parent node device.

4. The network node device of claim 3, wherein the adapting comprises reconfiguring the second distributed unit subframe for the distributed unit download transmission to the non-parent node device.

5. The network node device of claim 1, wherein the frame structure comprises a first mobile terminal subframe for mobile terminal download reception from the parent node device, a first distributed unit subframe for distributed unit upload reception from the non-parent node device, a second mobile terminal subframe for mobile terminal upload transmission to the parent node device, and a second distributed unit subframe for distributed unit download transmission to the non-parent node device.

6. The network node device of claim 5, wherein the adapting comprises reconfiguring the second distributed unit subframe for the distributed unit upload reception from the non-parent node device.

7. The network node device e of claim 1, the operations comprising:
operating the network node device as an integrated access and backhaul node device.

8. A method, comprising:
recognizing, by network equipment comprising a processor, an implicit indication from a parent node device indicating that at least a part of scheduling data received previously is adaptable;
in response to the recognizing of the implicit indication, adapting, by the network equipment, a frame structure previously employed for a mobile termination function to communicate as an access user equipment with the parent node device and previously employed for a distributed unit function to communicate as a backhaul device with a non-parent node device, resulting in a modified frame structure; and
communicating, by the network equipment, data based on the modified frame structure comprising subframes of the mobile termination function and subframes of the distributed unit function.

9. The method of claim 8, wherein the implicit indication comprises the parent node device not scheduling a resource allocation for the network equipment at a particular scheduling time.

10. The method of claim 8, wherein the frame structure comprises a first mobile terminal subframe for mobile terminal upload transmission to the parent node device, a first distributed unit subframe for distributed unit download transmission to the non-parent node device, a second mobile terminal subframe for mobile terminal download reception from the parent node device, and a second distributed unit subframe for distributed unit upload reception from the non-parent node device.

11. The method of claim 10, wherein the adapting comprises reconfiguring the second distributed unit subframe for the distributed unit download transmission to the non-parent node device.

12. The method of claim 8, wherein the frame structure comprises a first mobile terminal subframe for mobile terminal download reception from the parent node device, a first distributed unit subframe for distributed unit upload reception from the non-parent node device, a second mobile terminal subframe for mobile terminal upload transmission to the parent node device, and a second distributed unit subframe for distributed unit download transmission to the non-parent node device.

13. The method of claim 12, wherein the adapting comprises reconfiguring the second distributed unit subframe for the distributed unit upload reception from the non-parent node device.

14. The method of claim 8, further comprising:
operating, by the network equipment, as an integrated access and backhaul node device.

15. A non-transitory machine-readable medium, comprising executable instructions that, when executed by a processor of an integrated access and backhaul node device, facilitate performance of operations, the operations comprising:
recognizing an implicit indication from a parent node device indicating that at least a part of scheduling data received previously is adaptable;
in response to the recognizing of the implicit indication, adapting a frame structure previously employed for a mobile termination function to communicate as an access user equipment with the parent node device and previously employed for a distributed unit function to communicate as a backhaul device with a non-parent node device, the adapting resulting in a modified frame structure; and
communicating data based on the modified frame structure comprising subframes of the mobile termination function and subframes of the distributed unit function.

16. The non-transitory machine-readable medium of claim 15, wherein the implicit indication comprises the parent node device not scheduling a resource allocation for the integrated access and backhaul node device at a specified scheduling time.

17. The non-transitory machine-readable medium of claim 15, wherein the frame structure comprises a first mobile terminal subframe for mobile terminal upload transmission to the parent node device, a first distributed unit subframe for distributed unit download transmission to the non-parent node device, a second mobile terminal subframe for mobile terminal download reception from the parent node device, and a second distributed unit subframe for distributed unit upload reception from the non-parent node device.

18. The non-transitory machine-readable medium of claim 17, wherein the adapting comprises reconfiguring the second distributed unit subframe for the distributed unit download transmission to the non-parent node device.

19. The non-transitory machine-readable medium of claim 15, wherein the frame structure comprises a first mobile terminal subframe for mobile terminal download reception from the parent node device, a first distributed unit subframe for distributed unit upload reception from the non-parent node device, a second mobile terminal subframe for mobile terminal upload transmission to the parent node device, and a second distributed unit subframe for distributed unit download transmission to the non-parent node device.

20. The non-transitory machine-readable medium of claim 19, wherein the adapting of the frame structure comprises reconfiguring the second distributed unit subframe for the distributed unit upload reception from the non-parent node device.

* * * * *